Sept. 23, 1952 D. F. REYNOLDS 2,611,627
VEHICLE FRAME STRUCTURE
Filed Feb. 14, 1948 2 SHEETS—SHEET 1
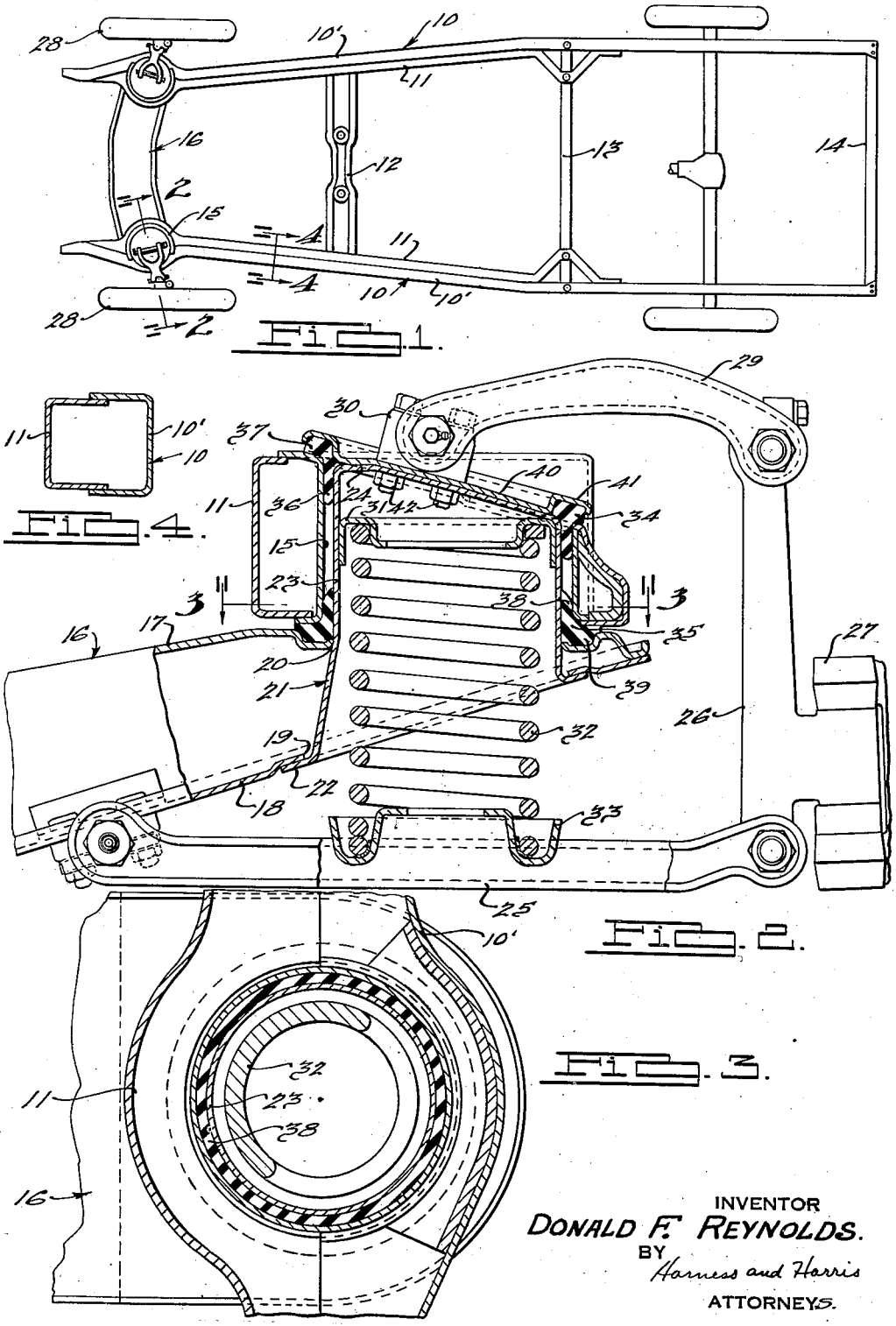
INVENTOR
DONALD F. REYNOLDS.
BY
Harness and Harris
ATTORNEYS.

Sept. 23, 1952   D. F. REYNOLDS   2,611,627
VEHICLE FRAME STRUCTURE
Filed Feb. 14, 1948   2 SHEETS—SHEET 2
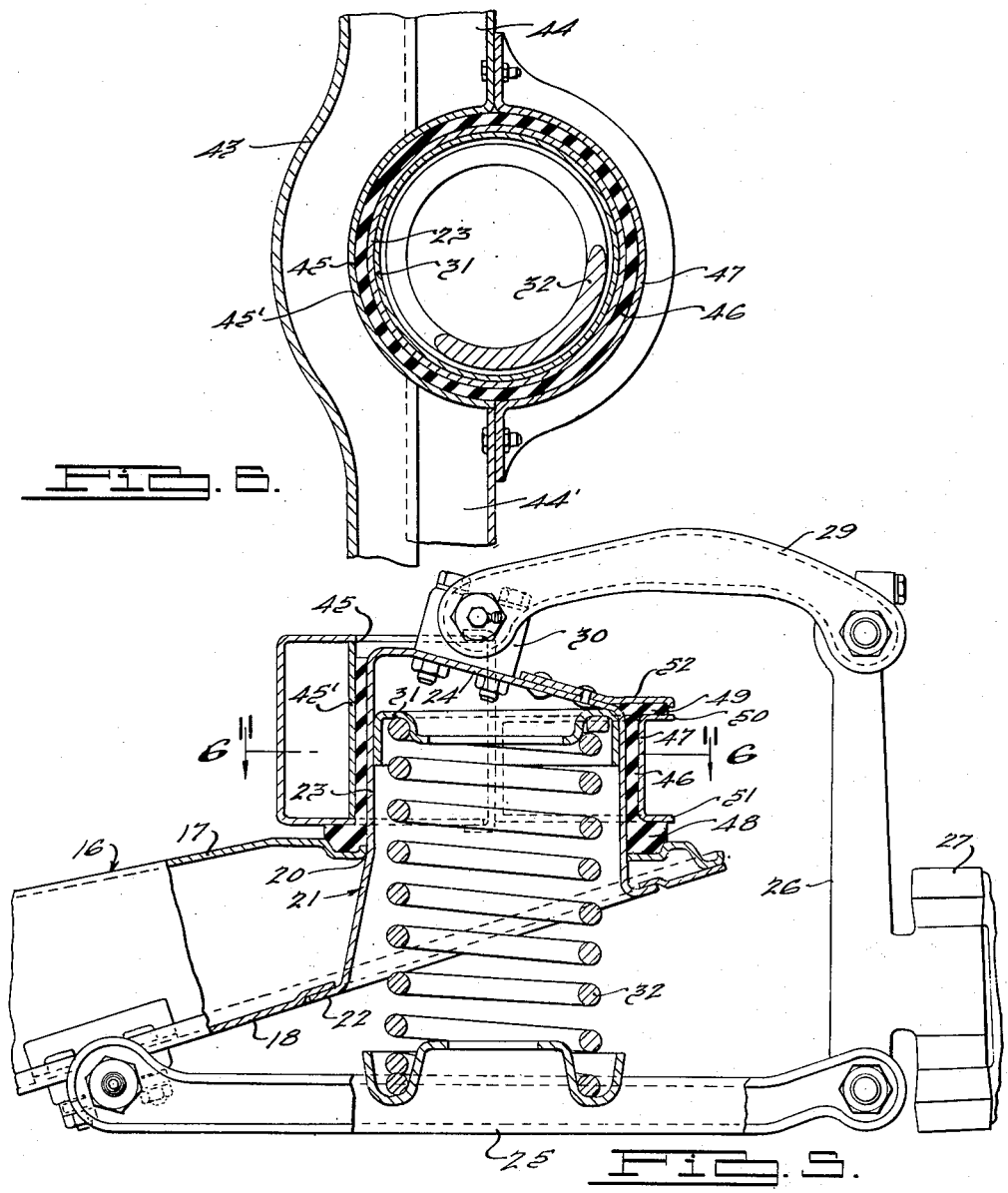
INVENTOR.
DONALD F. REYNOLDS.
BY
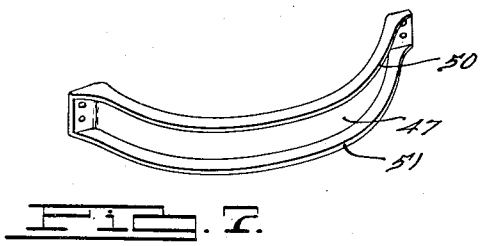
Harness and Harris
ATTORNEYS.

Patented Sept. 23, 1952

2,611,627

UNITED STATES PATENT OFFICE 2,611,627

VEHICLE FRAME STRUCTURE

Donald F. Reynolds, Berkley, Mich., assignor to Chrysler Corporation, Highland Park, Mich., a corporation of Delaware Application February 14, 1948, Serial No. 8,459

8 Claims. (Cl. 280—106.5)

My invention relates to motor vehicles and more particularly to the chassis frame structure and wheel suspension assembly of a motor vehicle.

In the past the cross member in the vehicle frame structure has been welded or in some other way rigidly secured to the side rails of a vehicle. As a result, all of the vibrations generated in either the side rail member or the cross member or applied on these members by the motor or other operative parts of the vehicle, have been communicated to the other because of their rigid construction. All of the noise and vibration that originated in the wheel was telegraphed through the suspension system to the cross member and the side rail which cooperated to produce undesirable vibration and noise. Vibration within the cross member alone was amplified due to its box-like structure.

It is a principal object of my invention to provide a motor vehicle with a chassis frame structure having a cross member and side rails so connected as to greatly reduce the communication of vibration therebetween.

It is another object of my invention to provide a motor vehicle with a side rail and cross member assembly of a simplified and inexpensive construction.

Another object of the invention is to provide a vehicle side rail and front cross member assembly which is particularly adapted to be conveniently coupled with independent front wheel suspensions.

It is a further object of my invention to provide a motor vehicle with a side rail, cross member and wheel suspension assembly from which the cross member and the entire wheel suspension may be readily removed from the vehicle and replaced in case of damage.

Further objects of the invention are to provide resiliently yieldable sound insulating material between the connected portions of the cross member and side rails of a vehicle chassis, and to provide improved means on the cross member of an assembly of this kind for cooperating with the sound insulating material and side rail which also serves to position the spring element of the wheel suspension system.

Another object of my invention is to provide a motor vehicle with a chassis side rail and cross member assembly in which the entire wheel suspension assembly may be pre-assembled with the cross member before the latter is resiliently mounted to the side rail.

Other objects and advantages of my invention will become more apparent from the following description taken in connection with the accompanying drawings in which:

Fig. 1 is a plan view of a motor vehicle chassis frame structure embodying my invention.

Fig. 2 is a fragmentary sectional view taken on the line 2—2 of Fig. 1.

Fig. 3 is a fragmentary transverse sectional view taken on the line 3—3 of Fig. 2.

Fig. 4 is a sectional view taken on the line 4—4 of Fig. 1.

Fig. 5 is a fragmentary sectional view of a chassis frame structure assembly embodying a modification of my invention.

Fig. 6 is a transverse sectional view taken on the line 6—6 of Fig. 5.

Fig. 7 is a perspective view of the bracket shown in Figs. 5 and 6.

Referring now to Fig. 1, I have shown a motor vehicle chassis frame structure having a pair of opposed substantially parallel longitudinally extending side rails, generally designated by the numeral 10, each comprising an outer channel member 10' which extends the full length of the chassis and in inner channel member 11 which extends from the front end of the chassis to a location rearwardly of its longitudinal center. The flanges of the inner channel member 11 fit within the flanges of the outer channel member 10' and they are welded together. The side rails 10 are provided with transverse connecting members 12, 13 and 14 which hold the side rails in a permanent relationship. Each channel member of the respective side rails 10 is bowed at the front end portion of the chassis to provide registering facing recesses which cooperate to form openings 15. The openings 15 formed in the side rails 10 facilitate the assembly of a cross member 16 with the side rails 10.

The cross member 16, as more clearly shown in Fig. 2, includes box structure having an upper face 17, and a lower face 18. Each extremity of the cross member 16 is provided with a pair of registering apertures 19 and 20, in the lower face 18, and the upper face 17, respectively. Each extremity is also provided with an inverted cup like projection 21, which is provided with an open end having an outwardly extending flange 22, a side wall 23, and a closed end wall 24. The flange 21 is welded to the lower face 18, adjacent the edge portions of the aperture 19. In this position, the side wall 23 extends through the aperture 20 and is welded to the edge portions thereof. The cross member 16 may be substantially completely pre-assembled with the suspension system before assembly with the side rails 10.

The suspension system as shown in Fig. 2 comprises a lower control arm 25, having one extremity pivotally mounted on the lower face 18 of the cross member 16. The other extremity of the control arm 25 is pivotally connected to the lower extremity of an upright knuckle bracket 26. The bracket 26 has secured thereto a king pin assembly 27, which in turn carries a vehicle wheel 28 as shown in Fig. 1. The upper extremity of the knuckle bracket 26 is pivotally connected to one extremity of an upper control arm 29. The other extremity of the upper control arm 29 is pivotally connected to a bracket 30. The bracket 30 is adapted to be secured to the closed end wall 24 of the projection 21, but may not be so secured until the cross member 16 and the side rails 10 are placed in an assembled relationship. Provided in the interior of the cup-like projection 21 is a circular retaining plate 31 which has its edge portion flanged to facilitate the securement of the plate to the wall 23 of the projection 21. The plate 31 acts as a positioning and retaining means for one extremity of a coil spring 32. The other extremity of the spring 32 is carried and positioned by another retaining plate 33, which is secured to the lower control arm 25.

When the cross member 16 and the side rails 10 are assembled, the projections 21 are partially positioned within the openings 15 formed by the registering bowed portions of the channel members 10' and 11. To resiliently mount the projections within the openings this assembly is provided with a pair of rubber-like rings 34 and 35. The ring 34 is provided with a relatively thin portion 36 positioned between the side wall 23 of the projection 21, and the wall of the opening 15 adjacent the upper end thereof, and a relatively thicker portion 37 integrally connected to the portion 36 and so positioned as to bring its lower face into engagement with the upper edge portions of the opening 15. The ring 35 is provided with portions 38 and 39 for separating the wall 23 from the wall of the opening 15 adjacent the lower end thereof, and the lower edge portion of the opening 15 from the face 17 adjacent the aperture 20, respectively.

To complete the assembly of the cross member 16 and the side rails 10, a circular plate 40 having a raised peripheral flange 41 is bolted to the closed end 24 of the projection 21 by bolts 42, which extend through and are carried by the bracket 30. The plate 40 is so positioned relative to the ring 34 that the raised peripheral flange 41 engages and covers the upper face of the thicker portion 37 of the ring 34. In this manner the plate 40 holds the projection 21 against downward movement from within the opening 15, since the flange 41 bears upon the rubber-like ring 34 which in turn engages the bowed portions of the channel members 10' and 11 adjacent the upper end of the opening 15.

In Figs. 5, 6, and 7, I have shown a modification of my invention. The cross-member and suspension system are identical to those shown in Figs. 1, 2, and 3 with the exception that the bracket 30 is directly bolted to the closed end 24 of the projection 21, and therefore like numbers are applied to like parts.

Each side rail of the frame structure in this form of the invention comprises two main channel members 43 and 44 having their flanges facing and overlapping each other. The flanges of the channel members 43 and 44 are welded together to form a box section. The channel member 44 terminates short of the front end of the chassis frame and the channel member 43 is bowed inwardly to provide a recess 45, the wall of which is formed by a semi-circular plate 45' which is welded to the edges of the flanges of the channel member 43 and to the front end of the channel member 44 as well as to the rear end of a channel shaped extension 44' which is welded to the section of the channel 43 in advance of its bowed portion. The semi-circular recess 45 on the outer side of each rail is adapted to receive a projection 21 of the cross member 16. The projection 21, as mounted within the opening 45 is separated therefrom by a cylindrical sleeve comprising rubber-like material which is positioned around the outside wall 23 of the projection 21. The projection is held within the opening 45 by a semi-circular bracket 47 which is bolted to the channel member 44 and the extension 44' and completes the circle of support around the projection 21, clampingly holding the projection 21 in place through the medium of the sleeve 46.

The sleeve 46 has a thickened, integral, radial flange 48 at its lower end which engages the edge portion of the opening 20 in the upper face 17 of the cross member 16. Provided on the other extremity of the sleeve 46 is an integral semi-circular radial flange 49 which extends outwardly around only that portion of the sleeve 46 that is exterior of the semi-circular opening 45 in the channels 43 and 44, to engage portions of the bracket 47.

The bracket 47 is provided with parallel upper and lower flanges 50 and 51, respectively. The lower flange 51 engages the upper face of the thickened flange 48 of the sleeve 46 to thereby limit the upward movement of the projection 21 through the opening 45, as viewed in Fig. 5. The semi-circular flange 49 is positioned between the upper flange 50 of the bracket 47 and a semi-circular plate member 52 which is riveted or by some similar means securely attached to the closed end 24 of the projection 21. By this construction, the plate member 52 holds the projection 21 from downward movement, as can be clearly seen in Fig. 5.

It may be readily seen that in both forms of the invention as herein disclosed, the cross member 16 and the entire suspension may be preassembled before final assembly with the side rails. In the form of the invention as shown in Figs. 1, 2, and 3 the cross member 16 and the suspension system may be pre-assembled except for the plate 40 and the bracket 30 which must be bolted in place after the projection 21 has been placed within the opening 15. In the form of the invention shown in Figs. 5, 6, and 7 the entire suspension system may be pre-assembled with the cross member 16 and all that need be done is to insert the projections 21 within the semi-circular openings 45 and thereafter bolt the brackets 47 to the side rails 44 and 44'.

By employing the rubber-like rings 34 and 35 and the sleeve 46 to assemble the cross members 16 with the side rails, the vibration between the cross members and the side rails is greatly reduced. The resilient yieldable sound insulating qualities of the rings and sleeve serve to absorb the greater portion of the vibration transmitted from the wheels to the side rails and from the engine of the vehicle to the cross member.

Although but several embodiments of the invention are herein shown and described, it will be understood that various changes in the details of construction and materials employed may be made without departing from the spirit of the invention.

I claim:

1. A motor vehicle frame structure comprising a pair of laterally spaced frame members each having a recess therein, a cross member having a pair of projections one adjacent each extremity of said cross member, said projections being adapted to be positioned within said recesses of said frame members, yieldable means positioned between said projections and said frame members, and means adapted to hold said cross member and said frame members in assembled relationship.

2. A motor vehicle frame structure comprising a pair of laterally spaced frame members each having a recess therein, a cross member having a pair of cup-shaped projections one adjacent each extremity, said projections being adapted to be received in said recesses of said frame members, yieldable sound insulating means positioned between said projections and said frame members, and a pair of anchor means one secured to each projection of said cross member and adapted to hold said cross member and said pair of frame members in assembled relationship.

3. In a vehicle having a suspension system including spring means, a frame structure comprising a first frame member having a recess therein, a second frame member having a cup-shaped projection adapted to be positioned in the recess in said first frame member, said projection partially housing and positioning one extremity of said spring means, yieldable means having portions separating said projection from said first frame member, and anchor means secured to said projection and having portions engaging said yieldable means for holding said frame members in assembled relationship.

4. In a vehicle having a suspension system including spring means, a frame structure comprising a first frame member having an opening therein, a second frame member having a cup-shaped projection adapted to be positioned in the opening of said first frame member, said projection partially housing and positioning one extremity of said spring means, yieldable means positioned between said projection and the sides of said opening and having portions overlapping said first frame member, and anchor means secured to said projection and having portions engaging said yieldable means for holding said frame members in assembled relationship.

5. A vehicle including a frame structure comprising laterally spaced side rails each having an opening at one end of said frame structure; a cross member, wheel and spring suspension assemblies carried by said cross member for supporting said end of said frame structure; an inverted hollow cup-shaped projection on each end of said cross member having an open lower end, each of said projections being receivable in each of said openings, respectively; said wheel and spring suspension assemblies including coil springs each having an end portion receivable in one of said cup-shaped projections, respectively; and means for detachably securing together said frame structure and said projections, said wheel and spring suspension assemblies and said cross member being removable as a unit from and replaceable as a unit in said frame structure.

6. A vehicle including a frame structure comprising laterally spaced side rails each having an opening at one end of said frame structure; a cross member, wheel and spring suspension assemblies carried by said cross member for supporting said end of said frame structure; an inverted hollow cup-shaped projection on each end of said cross member having an open lower end, each of said projections being receivable in each of said openings, respectively; yieldable sound insulating material disposed between said projections and the walls of said openings; said wheel and spring suspension assemblies including coil springs each having an end portion receivable in each of said cup-shaped projections, respectively; and means for detachably securing together said frame structure and said projection, said assemblies and said cross member being removable as a unit from and replaceable as a unit in said frame structure.

7. A vehicle including a frame structure comprising laterally spaced side rails each having a bowed section forming a recess at one end of said frame structure; a cross member, wheel and spring suspension assemblies carried by said cross member for supporting said end of said frame structure; an inverted hollow cup-shaped projection on each end of said cross member having an open lower end, each of said projections being receivable in each of said bowed sections, respectively; and means for detachably securing together said frame structure and said projections, said assemblies and said cross member being removable as a unit from and replaceable as a unit in said frame structure.

8. A vehicle including a frame structure comprising laterally spaced side rails each having an opening at one end of said frame structure; a cross member, wheel and spring suspension assemblies carried by said cross member for supporting said end of said frame structure; an inverted hollow cup-shaped projection on each end of said cross member having an open lower end, each of said projections being receivable in each of said openings, respectively; yieldable sound insulating material disposed between said projections and the walls of said openings and having portions overlapping said frame structure; said wheel and spring suspension assemblies including coil springs each having an end portion receivable in one of said cup-shaped projections respectively, and anchor means secured to each projection having portions engaging said overlapping portions of said yieldable material for detachably securing said frame structure and said projections together, said assemblies and said cross member being removable as a unit from and replaceable as a unit in said frame structure.

DONALD F. REYNOLDS.

REFERENCES CITED

The following references are of record in the file of this patent:

UNITED STATES PATENTS

| Number | Name | Date |
| --- | --- | --- |
| 1,823,429 | Jansson et al. | Sept. 15, 1931 |
| 1,965,561 | Sherman | July 3, 1934 |
| 2,004,532 | Mapes | June 11, 1935 |
| 2,208,709 | Tjaarda | July 23, 1940 |
| 2,251,416 | Parker | Aug. 5, 1941 |
| 2,340,149 | Slack | Jan. 25, 1944 |
| 2,384,096 | Kishline | Sept. 4, 1945 |
| 2,389,907 | Helmuth | Nov. 27, 1945 |